Patented Aug. 27, 1946

2,406,658

UNITED STATES PATENT OFFICE 2,406,658

COATINGS FOR CELLULOSE ACETATE PLASTICS

Charles Bogin, Terre Haute, Ind., assignor to Commercial Solvents Corporation, Terre Haute, Ind., a corporation of Maryland No Drawing. Application October 23, 1943, Serial No. 507,459

6 Claims. (Cl. 117—144)

My invention relates to coating compositions suitable for use in coating cellulose acetate plastics. More particularly, it is concerned with a method of coating such materials with lacquers in which cellulose acetate butyrate is the principal film-forming agent.

Substantially, from the time that cellulose acetate plastics were introduced, the industry has been in search of a coating composition which would be satisfactory for use thereon. The availability of a coating composition of this type would be advantageous from many standpoints. For example, the cost of colored plastics which require the incorporation of expensive pigments throughout the material, would be materially reduced by the use of a top lacquer coating of the desired shade. Lacquers of the above-mentioned type would also permit a reduction in manufacturing costs by incorporating in these plastics cheap filling materials, since the high gloss frequently desired could be supplied by the top coating. In addition, the availability of such a lacquer would allow the colors of the plastic articles to be changed whenever desired.

Among certain of the film-forming materials previously tried in an attempt to find a satisfactory coating composition for cellulose acetate plastics, were nitro-cellulose and ethyl cellulose. However, these materials were found to be unsatisfactory for this purpose because of their extra high affinity for the plasticizers present in the cellulose acetate plastics. As a result of this undesirable property, the plasticizers contained in the plastic tend to be absorbed by the outer coating and within a short time the surface becomes very sticky and soft. Cellulose acetate lacquers have likewise been tried. However, the solvent mixtures utilized in conjunction with these film-forming materials, often attacked the surface of the cellulose acetate plastic, thereby causing a phenomenon known in the art as "lifting," which consists essentially of a pronounced wrinkling of the plastic surface.

I have now discovered that it is possible to coat cellulose acetate plastics with a lacquer capable of producing a film thereon which has none of the defects characteristic of the lacquers previously used for this purpose. The lacquers which I have found to be highly satisfactory in coating cellulose acetate plastics, are prepared by dissolving cellulose acetate butyrate in a solvent mixture that is not a solvent for cellulose acetate. In this connection, it should be pointed out that the solvent mixtures employed must exhibit no solvent action whatever on cellulose acetate, since I have found that the use of those materials that are border-line solvents for cellulose acetate results in the "lifting" phenomenon mentioned above.

Solvent mixtures suitable for the preparation of the lacquers of my invention, include the lower nitroalkanes, such as nitromethane, nitropropane, nitrobutane, etc.; ketone compounds, such as methyl ethyl ketone, diacetone alcohol, and/or an ester of a lower aliphatic alcohol, such as methyl acetate, ethyl acetate, together with propyl acetate, amyl acetate, butyl acetate, and the lower aliphatic alcohols such as ethanol, butanol, etc., and suitable hydrocarbon diluents. While certain of the foregoing materials are solvents for cellulose acetate, this property can be satisfactorily checked by the addition of substantial amounts of diluents, such as butyl acetate, the lower aliphatic alcohols, toluene, or high-solvency naphtha, for which the solutions of cellulose acetate butyrate have high tolerances, but which are tolerated only to a slight degree by cellulose acetate solutions.

Cellulose acetate butyrate, supplied to the industry at the present time, consists of two principal grades, i. e., the type having a high butyryl content and a low acetyl content, and the grade possessing a high acetyl content and a low butyryl content, i. e., an acetyl content of from about 28 per cent and about 33 per cent, and a butyryl content of between about 14 and about 20 per cent. The former grade of cellulose acetate butyrate, according to my findings, is unfit for use in my invention since I have found that films thereof applied to cellulose acetate plastics tend to sweat and become soft on standing owing to absorption of the plasticizer in the cellulose acetate plastic. Lacquers utilizing cellulose acetate butyrate having a high acetyl content and a low butyryl content, however, exhibit none of these defects when applied to the surface of cellulose acetate plastics in accordance with my invention.

The concentration of cellulose acetate butyrate employed may, in general, vary from between 4 to 10 grams for each 100 cc. of solvent mixture utilized. For the majority of lacquers, however, I prefer to employ about 6 grams of cellulose acetate butyrate for each 100 cc. of solvent mixture. An additional factor to be observed in connection with the quantity of cellulose acetate butyrate employed, is the fact that various types of this material having substantially the same solubility, produce solutions with different viscosities. Therefore, in selecting the cellulose acetate butyrate to be used, consideration should be given to the concentration thereof and the desired viscosity of the resulting solution. Various synthetic resins produced by condensation polymerization, such as, for example, those of the alkyd, phenol-formaldehyde, and aryl sulfonamide-formaldehyde types, may be incorporated in the lacquers of my invention to the extent of not substantially in excess of 25 per cent, to produce lacquers capable of forming highly satisfactory films when applied to the surface of cellulose acetate plastics. Concentrations of such resins substantially in excess of 25 per cent, are in general undesirable since the plasticizers in the cellulose acetate are absorbed by the resins to such an extent that the applied film becomes sticky and greasy in a short time. Any of the plasticizers and pigments commonly used in conjunction with cellulose acetate butyrate, may be employed.

In order to further illustrate my invention, the following specific examples of typical cellulose acetate butyrate lacquers suitable for use in coating cellulose acetate plastics, are included.

Example I

| | | |
|---|---|---|
| Cellulose acetate butyrate (acetyl content 29%; butyryl content 15%) | g | 8 |
| 1-nitropropane | cc | 25 |
| Butyl acetate | cc | 25 |
| Ethyl acetate | cc | 25 |
| Toluene | cc | 25 |

Example II

| | | |
|---|---|---|
| Cellulose acetate butyrate (acetyl content 28%; butyryl content 14%) | g | 6 |
| 1-nitropropane | cc | 20 |
| Ethyl alcohol | cc | 15 |
| Butyl alcohol | cc | 10 |
| Toluene | cc | 55 |

Example III

| | | |
|---|---|---|
| Cellulose acetate butyrate (same grade as used in Example II) | g | 8 |
| 2-nitropropane | cc | 20 |
| Methyl ethyl ketone | cc | 15 |
| Butyl acetate | cc | 35 |
| High-solvency naphtha | cc | 30 |

Example IV

| | | |
|---|---|---|
| Cellulose acetate butyrate (same grade as used in Example I) | g | 4 |
| Non-drying oil-modified alkyd resin | g | 1 |
| 1-nitrobutane | cc | 25 |
| Ethyl acetate | cc | 20 |
| Butyl acetate | cc | 25 |
| Toluene | cc | 30 |

Example V

| | | |
|---|---|---|
| Cellulose acetate butyrate (acetyl content 28.5%; butyryl content 18%) | g | 6 |
| Nitroethane | cc | 15 |
| Methyl ethyl ketone | cc | 10 |
| Ethyl acetate | cc | 10 |
| Butyl acetate | cc | 30 |
| High-solvency naphtha | cc | 30 |
| Diacetone alcohol | cc | 5 |

Example VI

| | | |
|---|---|---|
| Cellulose acetate butyrate (same grade as used in Example V) | g | 8 |
| Butyl phthalate | g | 1.2 |
| Ethyl acetate | cc | 20 |
| Methyl ethyl ketone | cc | 20 |
| Butyl acetate | cc | 25 |
| Toluene | cc | 25 |
| Diacetone alcohol | cc | 10 |

Lacquers of the type illustrated by the above examples, when applied to cellulose acetate plastic articles, produced films thereon which were entirely satisfactory and capable of withstanding aging tests at a temperature of 100° F., in an atmosphere having a humidity of between 85 and 95 per cent. At the end of a two-weeks' test period, under the foregoing conditions, the films were found to be still in good condition.

It will be apparent, to those skilled in the art, that the present invention, as described above, may be modified with respect to both the solvent mixtures and the film-forming agents utilized, as well as other factors, without departing from the scope thereof. In general, my invention is intended to cover the use of cellulose acetate butyrate lacquers of the character set forth above, on cellulose acetate plastics wherein said lacquers utilize solvents that are incapable of dissolving or swelling cellulose acetate.

My invention having been described, what I claim is:

1. A method for coating cellulose acetate plastics plasticized with plasticizers having high affinity for nitrocellulose, cellulose acetate, and cellulose ethers to produce a film thereon which will not lift during the application thereof and which will not soften on aging at moderately high temperatures in a humid atmosphere, which comprises applying to the surface of said plastic a coating composition comprising cellulose acetate butyrate having an acetyl content of between about 28 and about 33 per cent, and a butyryl content of between about 14 and about 20 per cent, dissolved in a solvent mixture consisting essentially of a major portion of a hydrocarbon diluent and a minor proportion of a lower nitroalkane and an aliphatic alcohol.

2. A method of coating cellulose acetate plastics plasticized with plasticizers having high affinity for nitrocellulose, cellulose acetate, and cellulose ethers to produce a film thereon which will not lift during the application thereof and which will not soften on aging at moderately high temperatures in a humid atmosphere, which comprises applying to the surface of said plastic a coating composition containing, as its principal film-forming agent, a mixture consisting of not more than 25 per cent of a synthetic resin, and cellulose acetate butyrate having an acetyl content of about 28 and about 33 per cent and a butyryl content of between about 14 and about 20 per cent, dissolved in a solvent mixture consisting essentially of a major portion of a hydrocarbon diluent and a minor proportion of a lower nitroalkane and an aliphatic alcohol.

3. The method of claim 1, in which the solvent mixture utilized consists essentially of approximately one-half toluene, about one-fourth lower aliphatic alcohols and approximately one-fourth lower nitroalkane.

4. A method for coating cellulose acetate plastics plasticized with plasticizers having high affinity for nitrocellulose, cellulose acetate, and cellulose ethers to produce a film thereon which will not lift during the application thereof and which will not soften on aging at moderately high temperatures in a humid atmosphere, which comprises applying to the surface of said plastic a coating composition comprising cellulose acetate butyrate having an acetyl content of between about 28 and about 33 per cent, and a butyryl content of between about 14 and about 20 per cent, dissolved in a solvent mixture which consists of approximately equal amounts of a lower nitroalkane, butyl acetate, ethyl acetate and toluene.

5. The method of claim 1, in which the solvent mixture utilized comprises essentially a major proportion of a diluent mixture consisting of butyl acetate and high-solvency naphtha and a minor proportion of a mixture of active solvents for cellulose acetate butyrate, consisting essentially of methyl ethyl ketone and a lower nitroalkane.

6. An article of manufacture, comprising a cellulose acetate plastic plasticized with plasticizers having high affinity for nitrocellulose, cellulose acetate, and cellulose ethers coated on the surface thereof with a film of cellulose acetate butyrate having an acetyl content from between about 28 and about 33 per cent and a butyryl content from between about 14 and about 20 per cent, which is non-lifting and which will not soften or sweat on aging at moderately high temperatures in a humid atmosphere.

CHARLES BOGIN.